(12) United States Patent
Ilvonen et al.

(10) Patent No.: US 12,418,188 B2
(45) Date of Patent: Sep. 16, 2025

(54) HEARING DEVICE CHARGERS

(71) Applicant: Sonova AG, Stäfa (CH)

(72) Inventors: Mika Ilvonen, Guelph (CA); Sahba Aazami, Founex (CH)

(73) Assignee: Sonova AG, Staefa (CH)

( * ) Notice: Subject to any disclaimer, the term of this patent is extended or adjusted under 35 U.S.C. 154(b) by 264 days.

(21) Appl. No.: 18/187,021

(22) Filed: Mar. 21, 2023

(65) Prior Publication Data

US 2024/0322578 A1   Sep. 26, 2024

(51) Int. Cl.
*H02J 7/00* (2006.01)
*H02J 50/00* (2016.01)
*H02J 50/10* (2016.01)
*H04R 25/00* (2006.01)

(52) U.S. Cl.
CPC .......... *H02J 7/0044* (2013.01); *H02J 50/005* (2020.01); *H02J 50/10* (2016.02); *H04R 25/602* (2013.01); *H04R 25/604* (2013.01); *H04R 25/652* (2013.01); *H04R 2225/025* (2013.01); *H04R 2225/31* (2013.01); *H04R 2460/17* (2013.01)

(58) Field of Classification Search
CPC .......... H04R 2460/17; H04R 2225/025; H04R 25/602; H04R 225/31
See application file for complete search history.

(56) References Cited

U.S. PATENT DOCUMENTS

| | | | |
|---|---|---|---|
| 8,169,185 B2 | 5/2012 | Partovi et al. | |
| 8,629,654 B2 | 1/2014 | Partovi et al. | |
| 9,967,644 B2 | 5/2018 | Chawan et al. | |
| 10,212,506 B2 | 2/2019 | Panecki et al. | |
| 11,595,767 B1 | 2/2023 | Rufenacht et al. | |
| 12,279,093 B2 | 4/2025 | Kim et al. | |
| 2007/0104343 A1 | 5/2007 | Bengtsson | |
| 2008/0118093 A1 | 5/2008 | Klemenz et al. | |

(Continued)

FOREIGN PATENT DOCUMENTS

| | | |
|---|---|---|
| CN | 110336342 A | 10/2019 |
| EP | 3518560 B1 | 11/2020 |

(Continued)

OTHER PUBLICATIONS

U.S. Appl. No. 18/187,021, filed Mar. 21, 2023, 20240322578A1.

(Continued)

*Primary Examiner* — Sunita Joshi
(74) *Attorney, Agent, or Firm* — Henricks Slavin LLP

(57) ABSTRACT

A hearing device charger including a charger housing and a hearing device support post, associated with the charger housing, including a top wall, with a top recess that extends a first distance in a first direction from an open end to a closed end and is configured to receive a portion of the hearing device housing, and a side wall that extends away from the top wall in the first direction and defines a support post outer perimeter and a support post outer recess that extends inwardly from the support post outer perimeter and extends a second distance away from the top wall in the first direction that is greater than the first distance and is configured to receive the hearing device removal handle. A transmitter coil may be associate with the hearing device support post, and a power supply may be operably connected to the transmitter coil.

20 Claims, 4 Drawing Sheets

(56) References Cited

U.S. PATENT DOCUMENTS

| | | | |
|---|---|---|---|
| 2008/0136369 | A1 | 6/2008 | Klemenz et al. |
| 2016/0020633 | A1 | 1/2016 | Han |
| 2018/0332408 | A1 | 11/2018 | Frei et al. |
| 2019/0173301 | A1 | 6/2019 | Narayanasamy et al. |
| 2019/0348863 | A1 | 11/2019 | De Masi et al. |
| 2020/0260176 | A1 | 8/2020 | Baltensperger et al. |
| 2021/0168536 | A1 | 6/2021 | Nielsen et al. |
| 2021/0385591 | A1 | 12/2021 | Nielsen et al. |
| 2022/0225004 | A1 | 7/2022 | Pedersen |
| 2023/0082030 | A1* | 3/2023 | Michaelsen .......... H02J 50/005 320/109 |
| 2023/0223797 | A1 | 7/2023 | Li et al. |
| 2024/0322615 | A1 | 9/2024 | Kim et al. |
| 2024/0323622 | A1 | 9/2024 | Kim et al. |

FOREIGN PATENT DOCUMENTS

| | | | |
|---|---|---|---|
| WO | WO 2015105648 A1 | 7/2015 | |
| WO | WO 2021220077 A1 | 11/2021 | |
| WO | WO 2022225445 A1 | 10/2022 | |

OTHER PUBLICATIONS

U.S. Appl. No. 18/187,032, filed Mar. 21, 2023, now U.S. Pat. No. 12,279,093 B2.
U.S. Appl. No. 18/187,043, filed Mar. 21, 2023, 20240322615A1.

* cited by examiner

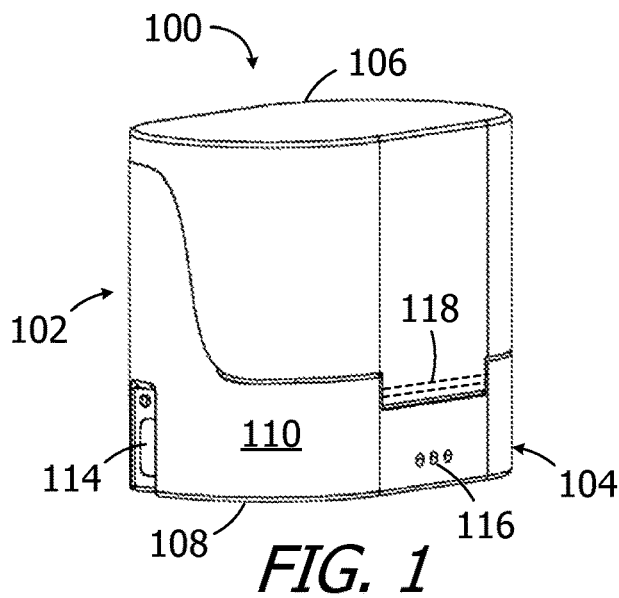
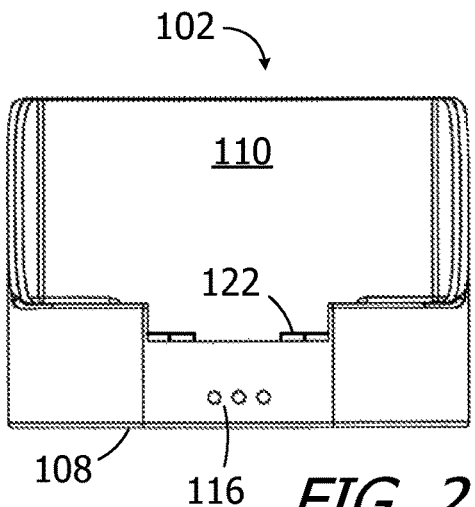
FIG. 1
FIG. 2
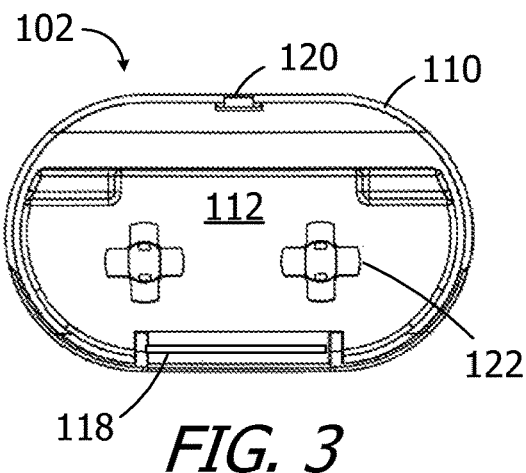
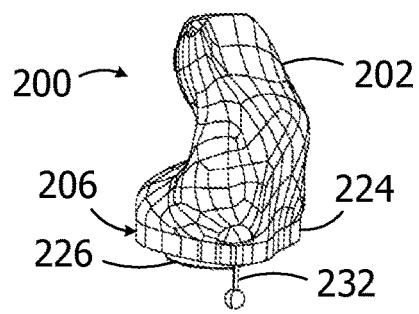
FIG. 3
FIG. 4
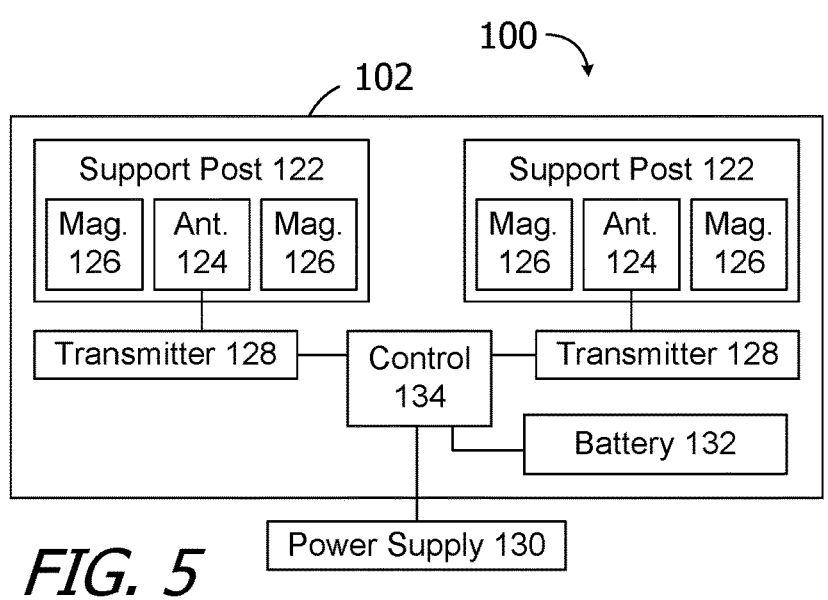
FIG. 5

HEARING DEVICE CHARGERS

BACKGROUND

1. Field

The present disclosure relates generally to hearing device chargers.

2. Description of the Related Art

In-the-ear hearing devices, in-the-canal hearing devices and completely-in-the-canal hear devices (collectively referred to herein as "ITE hearing devices") may include a housing that has a main portion with a sound output port that is positioned facing to the tympanic membrane and a faceplate at the lateral end of the main portion. Hearing device components, such as a microphone, a receiver, electronics and a rechargeable battery (e.g., a rechargeable lithium-ion battery) may be located with the housing main portion and/or faceplate. Ambient sound pressure waves are picked up by the microphone and converted into electrical signals. The electrical signals, in turn, are processed by sound processor circuitry. The processed signals drive the receiver, which delivers amplified (or otherwise processed) sound pressure waves to the ear canal.

The ITE hearing device battery may in some instances be wirelessly recharged with a battery charger. Here, the ITE hearing device includes a charging receiver coil and the battery charger includes a charging transmitter coil. The transmitter coil may be carried within a charging post on which the ITE hearing device is mounted during charging, and the charging post and ITE hearing device may be configured in such a manner that an optimal coil alignment is maintained. The charging post and ITE hearing device may also include magnets that secure the ITE hearing device to the charging post. Exemplary chargers are illustrated and described in US Pat. Pub. Nos. 2008/0118093A1 and 2021/0385591A1.

The present inventors have determined that the battery chargers associated with ITE hearing devices are susceptible to improvement. For example, the present inventors have determined that the charging posts in conventional battery chargers are not able to accommodate the removal handles that extend laterally from the faceplate of some ITE hearing devices.

SUMMARY

A hearing device charger in accordance with at least one of the present inventions comprises a charger housing and a hearing device support post, associated with the charger housing, including a top wall, with a top recess that extends a first distance in a first direction from an open end to a closed end and is configured to receive a portion of the hearing device housing, and a side wall that extends away from the top wall in the first direction and defines a support post outer perimeter and a support post outer recess that extends inwardly from the support post outer perimeter and extends a second distance away from the top wall in the first direction that is greater than the first distance and is configured to receive the hearing device removal handle. A transmitter coil may be associate with the hearing device support post, and a power supply may be operably connected to the transmitter coil.

A hearing system in accordance with at least one of the present inventions comprises an in-the-ear ("ITE") hearing device and a hearing device charger. The hearing device may include an ITE housing defining a medial end and a lateral end, a microphone, a receiver, a rechargeable battery, a hearing device magnet and a receiver coil associated with the housing, and a removal handle extending laterally from the lateral end of the housing. The hearing device charger may include a charger housing, a hearing device support post, associated with the charger housing and including a top wall and a support post outer recess, a magnet associated with the hearing device support post, a transmitter coil associated with the hearing device support post, and a power supply operably connected to the transmitter coil. The hearing device magnet and the support post magnet may be respectively oriented such that they are attracted to one another when the lateral end of the ITE housing abuts the top wall of the hearing device support post, and the respective configurations of the ITE hearing device and the hearing device support post may be such that the removal handle is located within the support post outer recess when the lateral end of the ITE housing abuts the top wall of the hearing device support post.

There are a variety of advantages associated with such chargers and systems. By way of example, but not limitation, the support posts allow hearing devices to be placed onto the charger in the intended manner despite the presence of removal handles, thereby facilitating the charging of hearing devices with removal handles.

The above described and many other features of the present inventions will become apparent as the inventions become better understood by reference to the following detailed description when considered in conjunction with the accompanying drawings.

BRIEF DESCRIPTION OF THE DRAWINGS

Detailed descriptions of the exemplary embodiments will be made with reference to the accompanying drawings.

FIG. 1 is a perspective view of a hearing device charger in accordance with one embodiment of a present invention.

FIG. 2 is a front view of a portion of the hearing device charger illustrated in FIG. 1.

FIG. 3 is a top view of a portion of the hearing device charger illustrated in FIG. 1.

FIG. 4 is a perspective view of an exemplary hearing device that may be used in conjunction with the hearing device charger illustrated in FIG. 1.

FIG. 5 is a functional block diagram of the hearing device charger illustrated in FIG. 1.

DETAILED DESCRIPTION OF THE EXEMPLARY EMBODIMENTS

Figure 6:
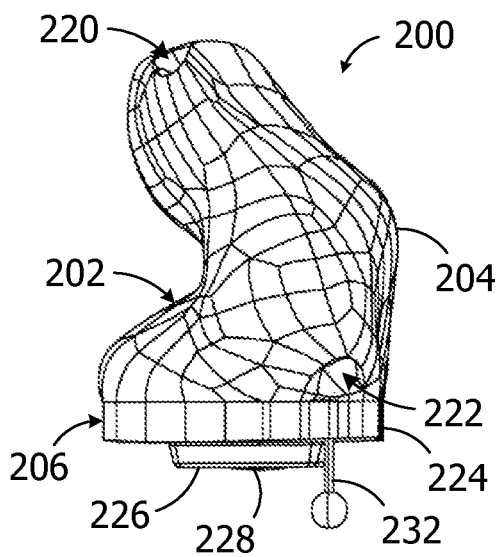
FIG. 6 is a side view of the hearing device illustrated in FIG. 4.

The following is a detailed description of the best presently known modes of carrying out the inventions. This description is not to be taken in a limiting sense, but is made merely for the purpose of illustrating the general principles of the inventions. The present inventions also have application in a wide variety of hearing devices that provide sound (i.e., either sound or a perception of sound) to the hearing impaired as well as others who require such hearing devices on a situational basis. Examples of such hearing devices include hearing aids, such as the ITE hearing aids described herein. The present inventions are not, however, limited to ITE hearing aids, and may be employed in combination with other hearing devices that currently exist, or are yet to be developed.

It should also be noted that if and when used herein, the term "lateral" refers to the direction and parts of hearing devices which face away from the tympanic membrane, the term "medial" refers to the direction and parts of hearing devices which face toward the tympanic membrane, the term "superior" refers to the direction and parts of hearing devices which face the top of the head, the term "inferior" refers to the direction and parts of hearing devices which face the feet, the term "anterior" refers to the direction and parts of hearing devices which face the front of the body, and the "posterior" refers to the direction and parts of hearing devices which face the rear of the body.

Referring to FIGS. 1-3, the exemplary hearing device charger (or "charger") 100 includes a base 102, with a housing 104 in which various components are located and on which various components are supported, and a cover 106 that may be pivotably mounted to the base 102. The exemplary housing 104 has a bottom wall 108, a perimeter wall 110, and an interior wall 112. A power port 114 extends through the perimeter wall 110 and a visible indicator 116, such as the illustrated set of LEDs, is associated with the perimeter wall. The cover 106, which is shown in a closed state in FIG. 1 and is omitted from FIGS. 2 and 3, may be pivotably secured to the base 102 with a hinge pin 118 and may be maintained in a closed state with a latch 120 on the housing perimeter wall 110 and an indentation (not shown) on the cover 106. The exemplary charger 100 is configured to accommodate hearing devices, such as the hearing device 200 illustrated in FIG. 4, that includes a removal handle, such as the removal handle (or "handle") 232. To that end, the charger 100 includes a pair of hearing device support posts 122 that are configured to accommodate handle 232 of the hearing device 200 as well as other handles of other hearing devices. The support posts 122 may be mounted on, or may extend through, the interior wall 112. Suitable materials for the base 102 and cover 106 include but are not limited to, polycarbonate/acrylonitrile butadiene styrene (PC/ABS) such as Sabic CYCOLY C1200HF or ABS such as Chimei POLYLAC PA757F.

Figure 13:
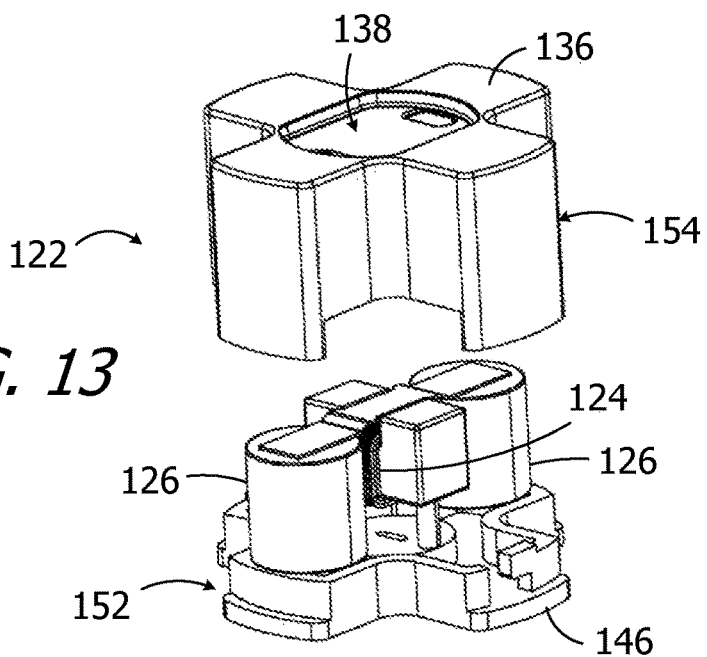
FIG. 13 is an exploded perspective view of a portion of the hearing device charger illustrated in FIG. 1.
Figure 14:
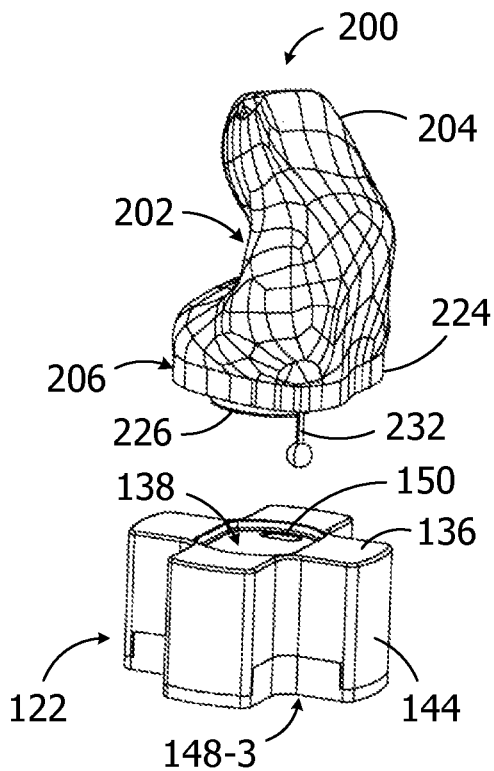
FIG. 14 is a perspective view of the hearing device illustrated in FIG. 4 and a portion of the hearing device charger illustrated in FIG. 1 in a disengaged state.
Figure 15:
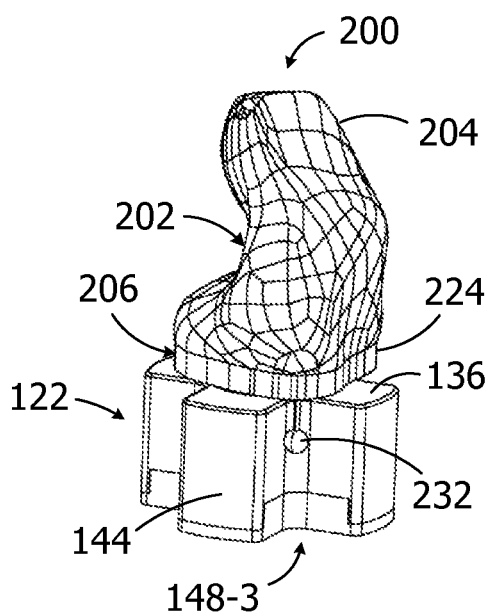
FIG. 15 is a perspective view of the hearing device illustrated in FIG. 4 and a portion of the hearing device charger illustrated in FIG. 1 in an engaged state.

The exemplary hearing device 200 is described in greater detail below with reference to FIGS. 6-9, the exemplary hearing device support posts 122 are described in greater detail below with reference to FIGS. 10-13, and the manner in which the handle 232 is accommodated by the hearing device support posts 122 is described in greater detail below with reference to FIGS. 14 and 15.

Although the present inventions are not so limited, the exemplary hearing device charger 100 is configured to wirelessly charge hearing devices such as the hearing device 200. To that end, and referring to FIG. 5, an antenna coil 124 that transmits power to a corresponding hearing device antenna coil 216 (FIGS. 8 and 9) via inductive coupling and magnets 126 that are attracted to hearing device magnets 218 (FIGS. 8 and 9) may be located within each of the support posts 122. Transmitter circuits (or "charge circuits") 128 drive the antenna coils 124. The magnets 126 and 218 secure the hearing device 200 to the charging post 122. Power may be provided by a power supply 130 (e.g., an external USB power supply) that may be connected to the power port 114 as well as by a rechargeable battery (or other energy storage device) 132. Operation of the charger is controlled by control circuitry 134.

As illustrated for example in FIGS. 6-9, the ITE hearing device 200 includes a housing 202, with a shell 204 that defines a shape corresponding to the ear canal and a faceplate 206 mounted to the lateral end of the shell, as well as components such as a microphone 208, a receiver 210, a rechargeable battery or other rechargeable power source 212, and sound processing electronics 214 within the housing 202. An antenna coil 216 that receives power from one of the charger antenna coils 124 (FIGS. 5 and 13) via inductive coupling is located within the faceplate 206, as are magnets 218 that are attracted to the charger magnets 126 (FIGS. 5 and 13). For example, the magnets 126 and 218 define respective N-poles and S-pole and the magnets may be oriented in such a manner that the N-poles of the magnets 126 and face the S-poles of the magnets 218. The housing shell 204 is sized and shaped for positioning within the ear canal and includes a sound output aperture 220 and a venting aperture 222. The shape of the housing shell 204 may be a generic shape that is suitable for a large number of patients or may be a custom shape that is 3D printed or otherwise formed for the ear canal of a particular patient. Suitable housing materials include, but are not limited to, plastics such as an acrylic and metals such as titanium.

Figure 7:
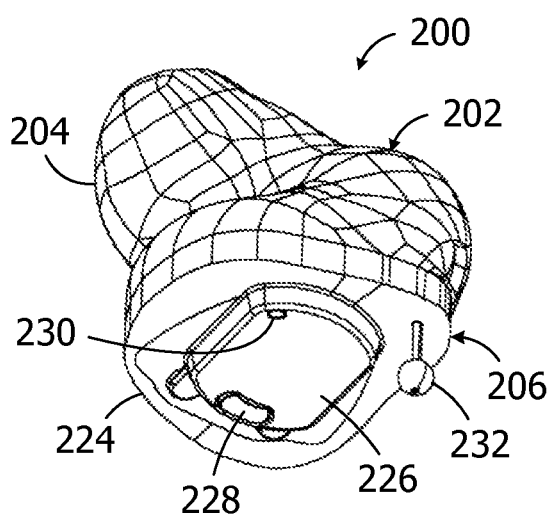
FIG. 7 is a perspective view of the hearing device illustrated in FIG. 4.
Figure 8:
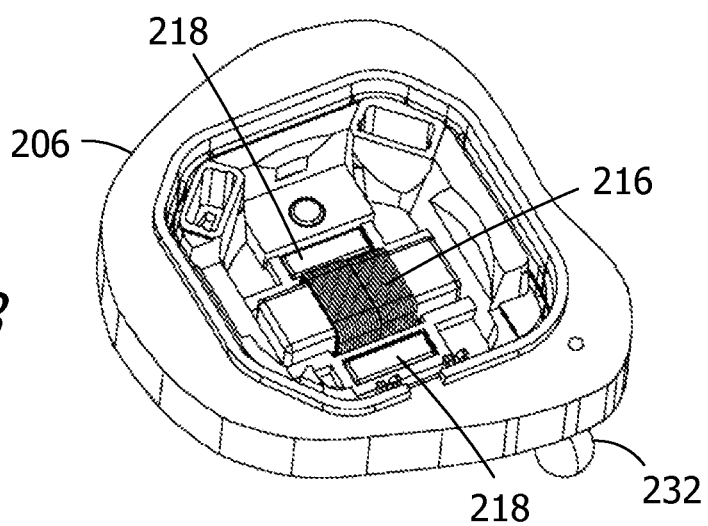
FIG. 8 is a perspective view of a portion of the hearing device illustrated in FIG. 4.
Figure 9:
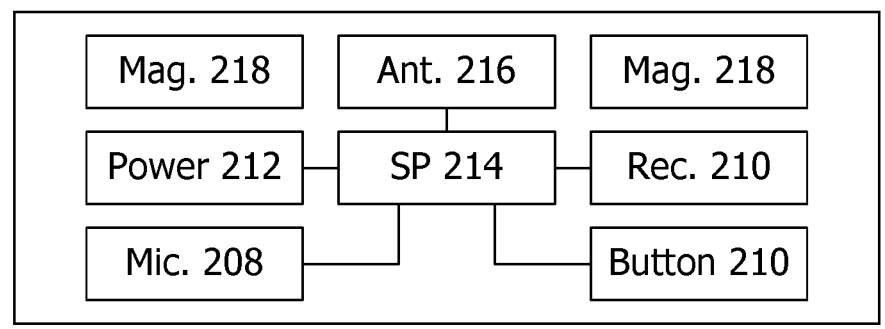
FIG. 9 is a functional block diagram of the hearing device illustrated in FIG. 4.

Referring more specifically to FIGS. 6 and 7, the exemplary faceplate 206 includes a main portion 224 and a projection 226, with a push button 228 that may perform various functions and a sound input aperture 230, that extends laterally from the main portion. The projection 226 is configured, i.e., is sized and shaped, to be received by a support post top recess 138 (FIGS. 10 and 11) in such a manner that the antenna coil 216 will be properly aligned with the charger antenna coil 124 and the magnets 218 will be properly aligned with the charger magnets 126. A handle 232, which may be used to remove the hearing device from the recipient's ear, extends laterally from the faceplate main portion 224.

Turning to FIGS. 10-13, the exemplary hearing device support posts 122 each include a top wall 136 with a top wall recess (or "recess") 138, that extends from an open end 140 to a closed end 142, and a side wall 144 that extends away from the top wall to a bottom wall 146. The side wall 144 extends around the top and bottom walls 136 and 146 and defines an outer perimeter P. Although the number may be increased or decreased on other implementations, the side wall 144 defines four outer recesses 148-1 to 148-4 (collectively outer recesses 148) that extend inwardly from the outer perimeter P. The outer recesses 148 extend the entire length L of the support posts 122, from the top wall 136 to the bottom wall 146, in the illustrated implementation. The outer recesses 148 extend less than the entire length L of the support post, i.e., from the top wall 136 to a point between the top wall and the bottom wall 146, in other implementations. In either case, the outer recesses 148 should be as long or longer than the associated hearing device handle 232. The length of the recesses 148 may in some instances range from 7.00 mm to 13.00 mm, which will accommodate most handles.

The exemplary top wall recess 138 is configured, i.e., is sized and shaped, to receive the associated hearing device faceplate projection 226. In the illustrated implementation, the recess 138 and faceplate projection 226 are mechanically keyed so that there are two possible orientations of the faceplate projection relative to the recess and, therefore, two possible orientations of the hearing device 200 relative to the associated support post 122. The orientations are offset by 180 degrees. By way of example, by not limitation, the recess 138 and faceplate projection 226 are generally rectangular in shape with curved longitudinal ends and straight sides. The recess 138 may also be configured to accommodate the button 228 on the hearing device faceplate projection 226 and, for example, may include a pair of button recesses 150 that are located and configured, i.e., are sized and shaped, such that the button 228 will be received in one other recesses when the hearing device faceplate projection 226 is located within the recess 138.

The exemplary support post 122 illustrated in FIGS. 10-13 has a cruciform shape when viewed from the above or in a plane perpendicular to the length L. Other shapes, including but not limited to shapes that define non-circular outer perimeters, may be employed. The number and location of the recesses may be adjusted to accommodate various removal handles and removal handle locations.

The supports posts may be formed and assembled in any suitable fashion. As illustrated in FIG. 13, the exemplary support posts 122 include a base 152, on which the antenna coil 124 and magnets 126 are supported, and a cover 154. The base 152 includes the bottom wall 146 and portions of the side wall 144, while the cover 154 includes the top wall 136 and the remaining portions of the side wall. The magnets 126 may be located within the base 102

Figure 10:
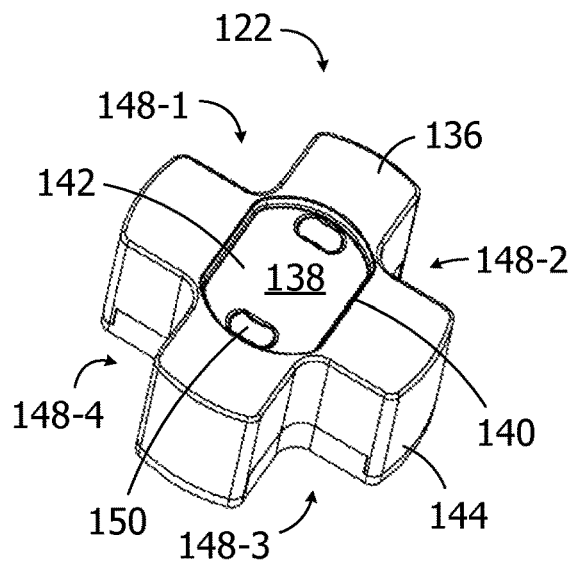
FIG. 10 is a perspective view of a portion of the hearing device charger illustrated in FIG. 1.
Figure 11:
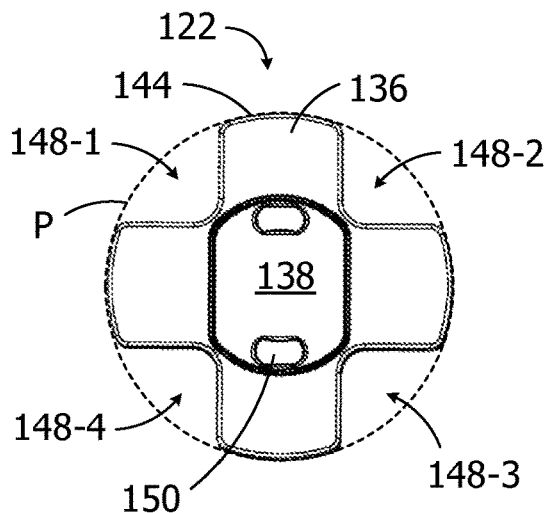
FIG. 11 is a top view of a portion of the hearing device charger illustrated in FIG. 1.
Figure 12:
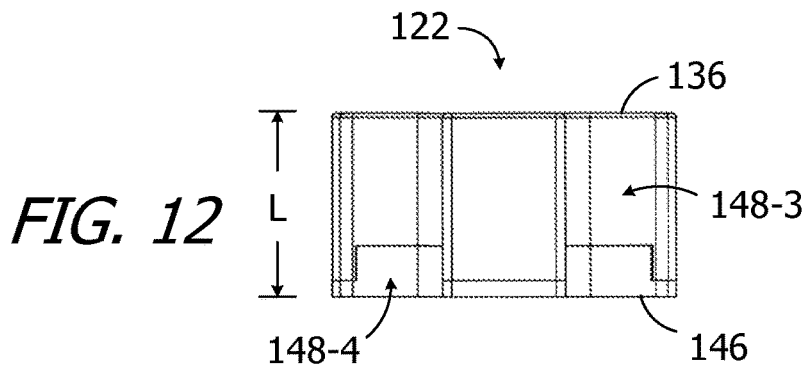
FIG. 12 is a front view of a portion of the hearing device charger illustrated in FIG. 1.

As alluded to above, the present charging posts are configured to accommodate hearings devices with a laterally extending removal handles and, in particular, the charging posts includes the recesses that provide clearance for a handle. To that end, and referring to FIG. 14, the exemplary hearing device 200 may be mounted onto the support posts 122 of the exemplary charger 100 by first orienting the hearing device relative to a support post in such a manner that the faceplate projection 226 is aligned with the recess 138 and the handle 232 is aligned with one of the outer recesses 148 (here, outer recess 148-3). The hearing device 200 may then lowered onto the support post 122, until the faceplate projection 226 is nested within the recess 138 and the handle 232 is within the outer recess 148-3, thereby aligning the magnets 126 and 218 and the coils 124 and 216. In those instances where the hearing device 200 is rotationally offset by 180 degrees from the orientation illustrated in FIGS. 14 and 15, the handle 232 will be located in the outer recess 148-1 (FIGS. 10 and 11). The outer recess 148-2 and 148-4 may be used to accommodate handles located in other locations on the faceplate 206.

Figure 16:
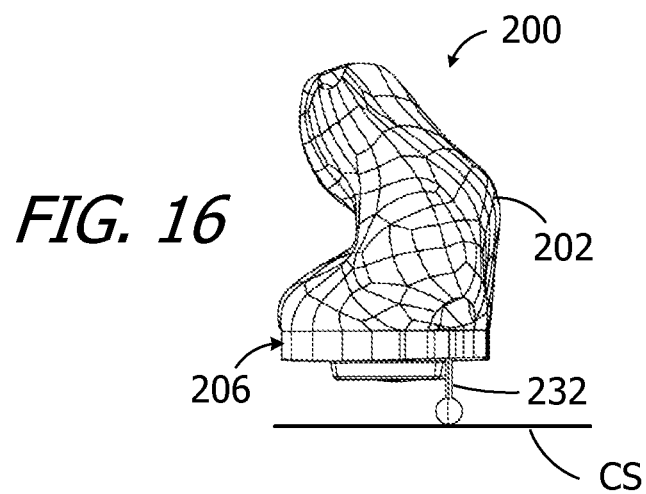
FIG. 16 is a side view of a hearing device and a charging surface of a conventional charger.

By way of comparison, the handle 232 would interfere with placement of the hearing device 200 onto the charging surface CS of a conventional charger that lacks the present recesses, as shown in FIG. 16.

Although the inventions disclosed herein have been described in terms of the preferred embodiments above, numerous modifications and/or additions to the above-described preferred embodiments would be readily apparent to one skilled in the art. By way of example, but not limitation, the inventions include any combination of the elements from the various species and embodiments disclosed in the specification that are not already described. It is intended that the scope of the present inventions extend to all such modifications and/or additions and that the scope of the present inventions is limited solely by the claims set forth below.

We claim:

1. A hearing device charger for use with a hearing device the includes a housing and a removal handle that extends laterally from the housing, the hearing device charger comprising:
   a charger housing;
   a hearing device support post, associated with the charger housing, including
      a top wall, with a top wall recess that extends a first distance in a first direction from an open top end to a closed bottom end and is configured to receive a portion of the hearing device housing when the hearing device is mounted onto the hearing device support post, and
      a side wall that extends away from the top wall in the first direction and defines a support post outer perimeter and a support post outer recess on the side wall, wherein the support post outer recess is dimensioned and positioned relative to the top wall recess such that the hearing device removal handle will be within support post outer recess when the hearing device is mounted onto the hearing device support post;
   a transmitter coil associated with the hearing device support post; and
   a power supply operably connected to the transmitter coil.

2. A hearing device charger as claimed in claim 1, further comprising:
   a magnet located adjacent to or within the hearing device support post.

3. A hearing device charger as claimed in claim 1, wherein the top wall recess defines a non-circular shape in a plane perpendicular to the first direction.

4. A hearing device charger as claimed in claim 1, wherein the first direction is perpendicular to the top wall.

5. A hearing device charger as claimed in claim 1, wherein the transmitter coil is located within the hearing device support post below the top wall recess.

6. A hearing device charger for use with a hearing device the includes a housing and a removal handle that extends laterally from the housing, the hearing device charger comprising:
   a charger housing;
   a hearing device support post, associated with the charger housing, including a top wall, with a top wall recess that extends a first distance in a first direction from an open end to a closed end and is configured to receive a portion of the hearing device housing, and a side wall that extends away from the top wall in the first direction and defines a support post outer perimeter and a plurality of outer recesses that extend inwardly from the support post outer perimeter and extend a second distance away from the top wall in the first direction that is greater than the first distance and are configured to receive the hearing device removal handle;

a transmitter coil associated with the hearing device support post; and a power supply operably connected to the transmitter coil.

7. A hearing device charger as claimed in claim 6, wherein the hearing device support post includes four outer recesses.

8. A hearing device charger as claimed in claim 6, wherein the hearing device support post defines a cruciform shape in a plane perpendicular to the first direction.

9. A hearing device charger as claimed in claim 1, wherein the top wall recess includes first and second button recesses.

10. A hearing device charger as claimed in claim 1, wherein
the charger housing includes a base and a cover that pivotably connected to the base and is movable between an open state and a closed state; and
the hearing device support post is secured to the base.

11. A hearing system, comprising:
an in-the-ear ("ITE") hearing device including
an ITE housing defining a medial end and a lateral end,
a microphone, a receiver, a rechargeable battery, a hearing device magnet and a receiver coil associated with the housing, and
a removal handle extending laterally from the lateral end of the housing; and
a hearing device charger including
a charger housing,
a hearing device support post, associated with the charger housing, including a top wall, and a support post outer recess,
a charger post magnet associated with the hearing device support post,
a transmitter coil associated with the hearing device support post, and
a power supply operably connected to the transmitter coil;
wherein the hearing device magnet and the support post magnet are respectively oriented such that they are attracted to one another when the lateral end of the ITE housing abuts the top wall of the hearing device support post; and
wherein the respective configurations of the ITE hearing device and the hearing device support post are such that the removal handle is located within the support post outer recess when the lateral end of the ITE housing abuts the top wall of the hearing device support post.

12. A hearing system as claimed in claim 11, wherein
the hearing device support post includes a top wall recess that defines a size and a shape; and
the ITE housing includes a faceplate with a projection that defines a size and a shape which correspond to the size and shape of the top wall recess.

13. A hearing system as claimed in claim 12, wherein
the top wall recess shape is a non-circular shape; and
the faceplate projection shape is the non-circular shape.

14. A hearing device charger as claimed in claim 11, wherein
the hearing device support post defines a support post outer perimeter; and
the support post outer recess extends inwardly from the support post outer perimeter.

15. A hearing device charger as claimed in claim 11, wherein
the transmitter coil and the hearing device magnet are located within the support post.

16. A hearing device charger as claimed in claim 11, wherein
the hearing device support post includes a plurality of outer recesses.

17. A hearing device charger as claimed in claim 11, wherein
the hearing device support post includes four outer recesses.

18. A hearing device charger as claimed in claim 11, wherein
the hearing device support post defines a cruciform shape in a plane perpendicular to the first direction.

19. A hearing device charger as claimed in claim 11, wherein
the top wall recess includes first and second button recesses.

20. A hearing device charger as claimed in claim 11, wherein
the charger housing includes a base and a cover that pivotably connected to the base and is movable between an open state and a closed state; and
the hearing device support post is secured to the base.

* * * * *